United States Patent [19]

Potier et al.

[11] Patent Number: 5,022,461

[45] Date of Patent: Jun. 11, 1991

[54] RAPID ACTION COUPLING SYSTEM FOR A HEAT EXCHANGER FLUID TANK

[75] Inventors: Michel Potier, Rambouillet; Gilles Briet, Gueugnon, both of France

[73] Assignees: Valeo Thermique Moteur, Le Mesnil-Saint-Denis; Hutchinson, Paris, both of France

[21] Appl. No.: 408,101

[22] Filed: Sep. 15, 1989

[30] Foreign Application Priority Data

Sep. 15, 1988 [FR] France .................. 88 12048

[51] Int. Cl.⁵ ............................................ F28F 9/02
[52] U.S. Cl. ..................................... 165/76; 165/176; 165/178; 285/137.1; 285/921
[58] Field of Search ................. 165/176, 178, 76; 285/137.1, 921

[56] References Cited

FOREIGN PATENT DOCUMENTS 3529052 2/1987 Fed. Rep. of Germany ... 285/137.1

Primary Examiner—Albert W. Davis, Jr.
Attorney, Agent, or Firm—Dennison, Meserole, Pollack & Sheiner

[57] ABSTRACT

The fluid tank is divided by a planar partition (3) into a fluid inlet compartment and a fluid outlet compartment. Toward the outside, the fluid tank has an annular protruding rim (19) surrounding two openings (1, 2), one for each of the two compartments. A coupling device case en bloc including inlet and outlet pipes for the fluid, which are placed facing the openings (1, 2), is provided with centering means cooperating with the rim (19).

16 Claims, 5 Drawing Sheets

RAPID ACTION COUPLING SYSTEM FOR A HEAT EXCHANGER FLUID TANK

BACKGROUND OF THE INVENTION

The invention relates to a rapid action coupling system for simultaneously coupling a fluid inlet chamber and a fluid outlet chamber, made in the same heat exchanger fluid tank and separated from one another by a partition, to an external circuit. The system includes adjacent inlet and outlet openings for the two chambers provided in the fluid tank and a coupling device, cast en bloc or in one piece, provided with at least two fluid passages and arranged to be attached to the fluid tank with these two fluid passages communicated respectively with the two openings in the fluid tank, as described in French Patent Application FR-A 2579308, corresponding to U.S. Pat. No. 4,765,658.

This system may be used with a heat exchanger, in particular for an automobile, that includes a bank of tubes formed either with U shaped tubes connecting the two chambers of the fluid tank to one another or with straight tubes divided into two groups, respectively connecting the two chambers to a second fluid tank located opposite the first one. This rapid action coupling replaces conventional systems, which include an inlet coupling piece and an outlet coupling piece protruding in two mutually remote locations of the fluid tank, and onto which flexible hoses are threaded in separate operations.

OBJECT AND SUMMARY OF THE INVENTION

The object of the present invention is to obtain a system of the type defined above that enables simplification of the structure of the fluid tank compared with that described in the aforementioned earlier patent application.

To this end, in the system according to the invention, the partition of the fluid tank is substantially planar over its entire length, and the inlet and outlet openings are disposed one on each side of the plane of the partition, while being located in proximity with it.

Preferably, the fluid tank and the coupling device have means for being interlocked in a coupled position.

It is a characteristic of the invention that the fluid tank has an annular rim protruding toward the exterior, surrounding all the inlet and outlet openings and assuring the centering of the coupling device.

In a first embodiment of the invention, the fluid passages of the coupling device are formed by two tubular walls spaced apart from one another and joined again in the vicinity of their end by a transverse plate cooperating at its periphery with the rim of the fluid tank.

In another embodiment, the two fluid passages of the coupling device are formed, in the region of communication with the openings, by a tubular sleeve of substantially circular cross section, divided on the interior by a diametrical dividing wall. The inlet and outlet openings are substantially semicircular and are defined by the partition; the partition and the dividing wall of the sleeve are located substantially one in the extension of the other.

In that case, the rim of the fluid tank can form a tubular sleeve divided on the interior by the partition, and the sleeve of the coupling device is wedged into the tubular sleeve. Preferably, a one-piece gasket is provided, having a toric portion disposed between the two sleeves and a transverse portion disposed between the dividing wall and the partition.

The invention is particularly applicable to a fluid tank in which the partition is perpendicular to the longitudinal direction of the fluid tank.

Advantageously, the system according to the invention further includes means for connecting a degassing circuit to an expansion vessel that is integral with the fluid tank.

In the second embodiment, the coupling device may include a degassing passage extending through the interior of its sleeve, parallel to its axis, and encroaching on at least one of the semicylindrical compartments defined by the dividing wall.

In either of these two embodiments, the coupling device may include a degassing neck protruding past its plate or sleeve so as to penetrate the fluid tank. Inside the fluid tank, the degassing neck may communicate with a connecting conduit for the expansion vessel that is separate from the two chambers of the fluid tank.

Further characteristics and advantages of the invention will become more apparent from the ensuing detailed description of two exemplary embodiments, taken in conjunction with the drawings.

DESCRIPTION OF THE PREFERRED EMBODIMENTS

Figure 1:
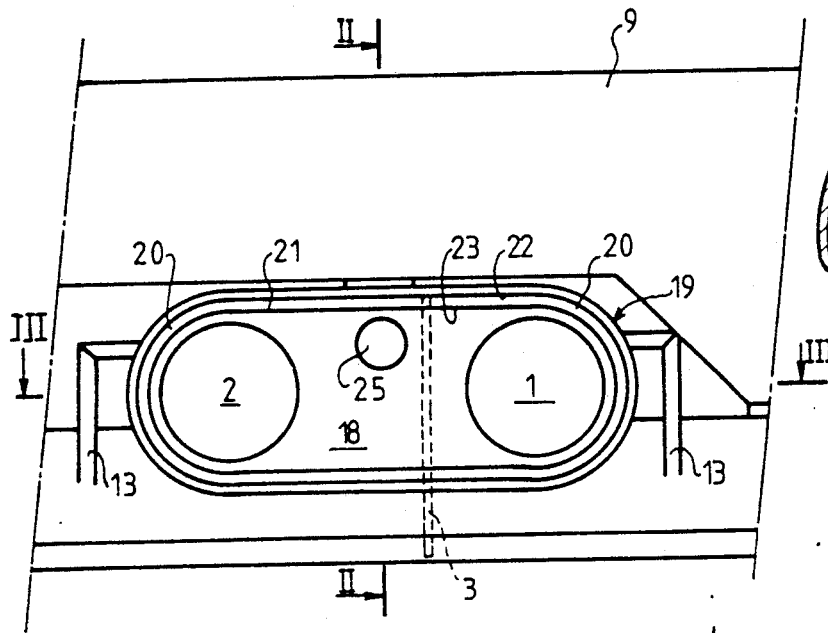
FIG. 1 is a fragmentary elevation view of a fluid tank intended to be coupled to a circuit by means of a rapid action coupling according to the invention, in a first exemplary embodiment.
Figure 2:
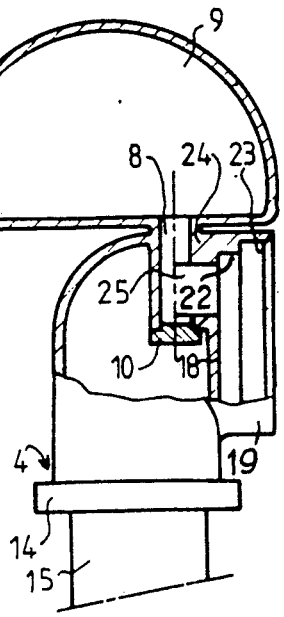
FIGS. 2 and 3 are fragmentary views of the fluid tank in section, taken along the lines II—II and III—III, respectively, of FIG. 1.
Figure 3:
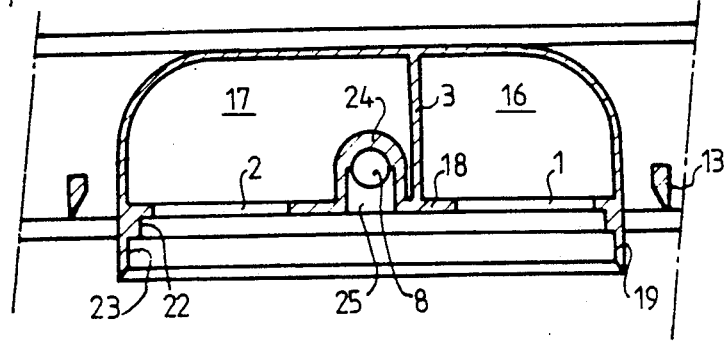

FIGS. 1-3 show part of an automobile heat exchanger including an upper fluid tank 4 associated with a collector 14 through which pass the upper ends of vertically oriented tubes 15, each extending over substantially the entire width of the fluid tank 4. These tubes 15 communicating at their lower end with a lower fluid tank (not shown). The fluid tank 4 is topped by an expansion vessel 9 molded in one piece with it. The fluid tank is divided on the interior, in its longitudinal direction, into two chambers 16 and 17 by a planar, transversely extending partition 3. The partition 3, molded in a single piece with the fluid tank, is connected in a sealed manner at its lower end to the collector 14, and is coupled via the remainder of its perimeter to the wall of the fluid tank, and in particular to a planar wall portion 18 in which two circular openings 1 and 2 are made on either side of and in proximity with the partition, these openings corresponding with the respective chambers 16 and 17. An annular rim 19 surrounding the openings 1 and 2 protrudes outward from the wall portion 18. The rim 19 is oriented substantially perpendicularly to the wall portion 18 and along the plane of this portion has a generally oblong shape including two semicircular terminal portions 20 which are coaxial with the openings 1 and 2 and are coupled to one another via rectilinear segments 21. The rim has a uniform profile over its entire contour, including, toward the inside of the rim, a rectilinear portion 22 adjacent the wall portion 18 and perpendicular to it, and a second rectilinear portion 23 parallel to the portion 22 and offset from it toward the outside of the fluid tank and toward the outside of the rim.

The wall 18 of the fluid tank has an internal boss 24 protruding into the chamber 17 and adjacent to the wall portion 18. The boss 24 is penetrated by a hole 8 extending parallel to the tubes 15, which discharges at its upper end into the expansion vessel 9 and is plugged with a stopper 10 undetachably connected to its lower end. In the absence of the stopper, the lower end would discharge into the chamber 17. Another hole 25 is formed perpendicular to the surface portion 18, between it and the hole 8. The hole 25 discharges on one end at the outer surface of the wall portion 18, inside the rim 19 and between the openings 1 and 2, and on the other end in the hole 8.

Reinforcing ribs 13 are provided on the outside of the wall of the fluid tank, on either side of the length of the rim 19.

Figure 4:
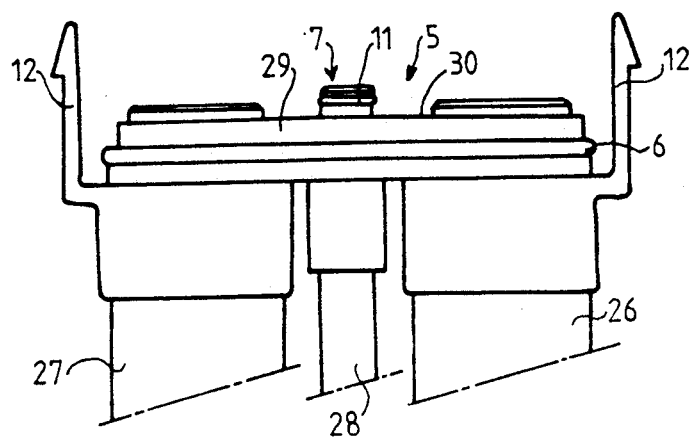
FIG. 4 is a fragmentary plan view of the coupling device associated with the fluid tank of FIGS. 1-3.
Figure 5:
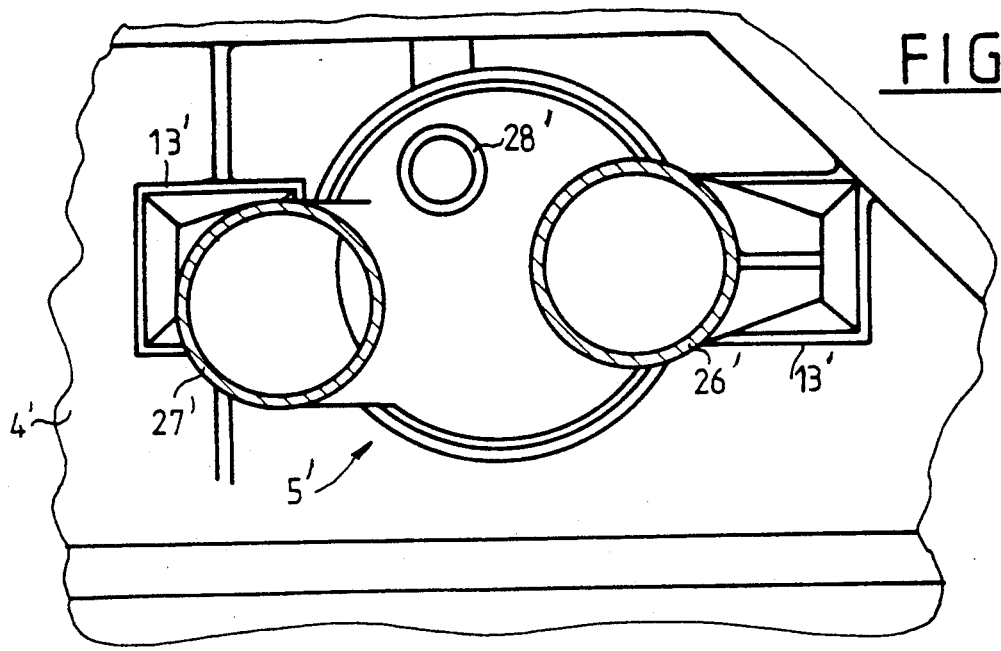
FIGS. 5 and 6 are fragmentary elevation views in section, taken along the lines V—V and VI—VI, respectively, of FIG. 8, of a fluid tank and the coupling device associated with it in a second exemplary embodiment of the invention.

The coupling device 5 cast en bloc, shown in FIG. 4, includes three parallel tubular pipes 26, 27, and 28, which are joined to one another in the vicinity of one of their ends via a plate 29 extending perpendicular to their axis. The arrangement of the axes of the pipes, and their diameter in their end portion protruding from the plate 29, are such that these end portions can engage the inside of the openings 1 and 2 and of the hole 25, respectively. As seen in this figure, the end 7 of the pipe 28 protrudes well beyond the plate 29, such that in the assembled position this end penetrates to the inside of the fluid tank and enables communication between the expansion vessel and the pipe 28. The plate 29 has a front face 30 that comes to rest against the outer face of the wall portion 18 of the fluid tank; the periphery of the plate cooperating with the rim 19, and in particular with the inner profile 22, 23 thereof, for centering the coupling device. The periphery of the plate has a toric oblong gasket 6 that rests over its entire length against the portion 23 of the rim profile. The end portion 7 of the pipe 28 is surrounded by a gasket 11 that rests against the wall of the hole 25.

The coupling device 5 has two flexible tabs 12 that cooperate with the ribs 13 to lock it onto the fluid tank. The rapid action coupling shown in FIGS. 5–10 is used for a heat exchanger of the same general design as that shown in part in FIGS. 1–3. Elements similar to those of the first embodiment are identified by the same reference numerals, with a prime (').

The fluid tank 4' differs from the fluid tank 4 described above essentially in that the plane wall portion 18 is omitted, and the oblong rim 19 is replaced with a sleeve 19' having a shape generated by revolution that protrudes laterally along the outside. The partition 3' extends as far as the inside of the sleeve, dividing it on its interior, thereby defining inlet and outlet openings of substantially semicircular shape.

The stopper 10' plugging the lower end of the degassing hole 8', which discharges into the expansion vessel 9', is detachable, and is provided with a toric gasket 40.

Figure 6:
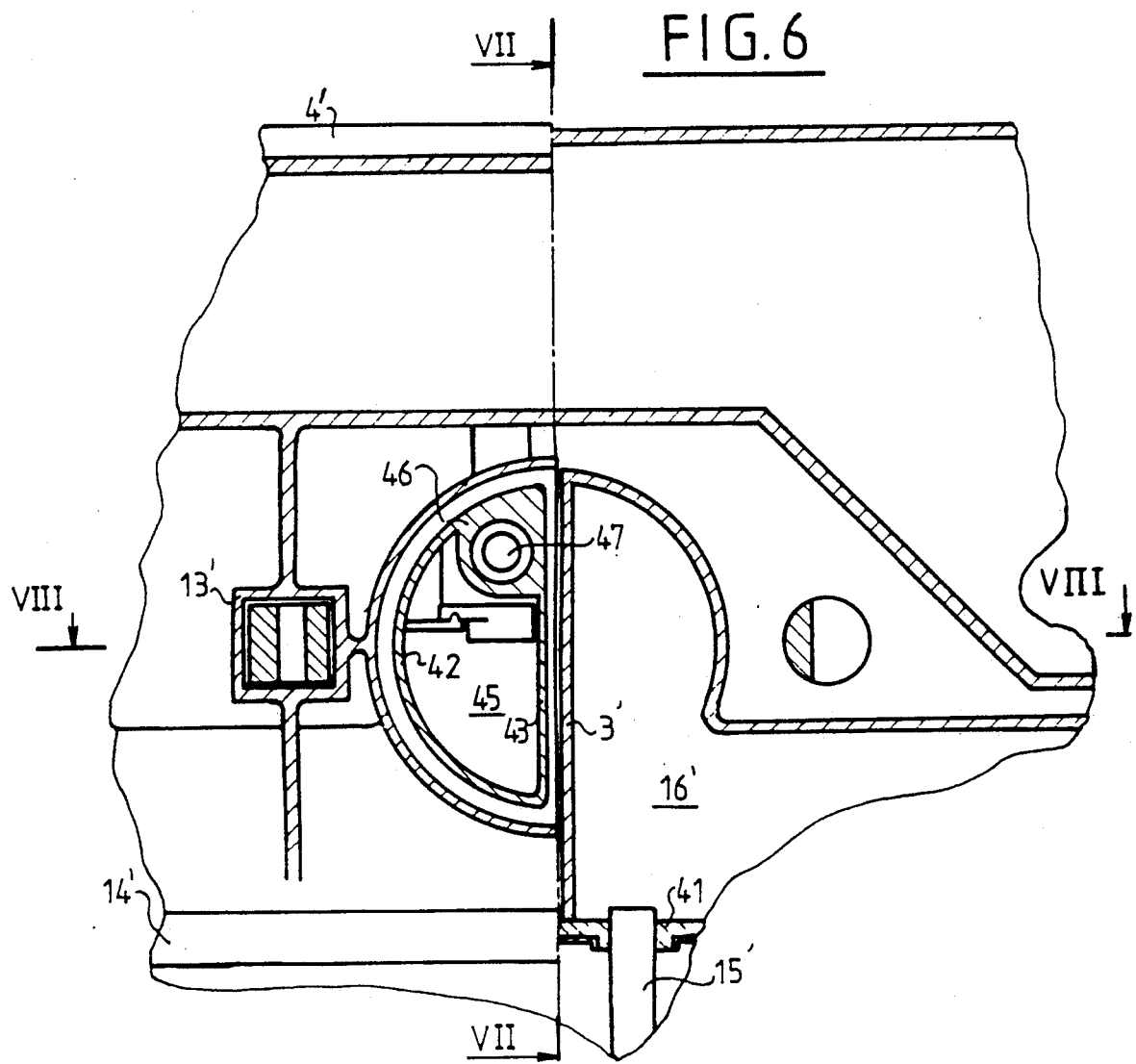
Figure 7:
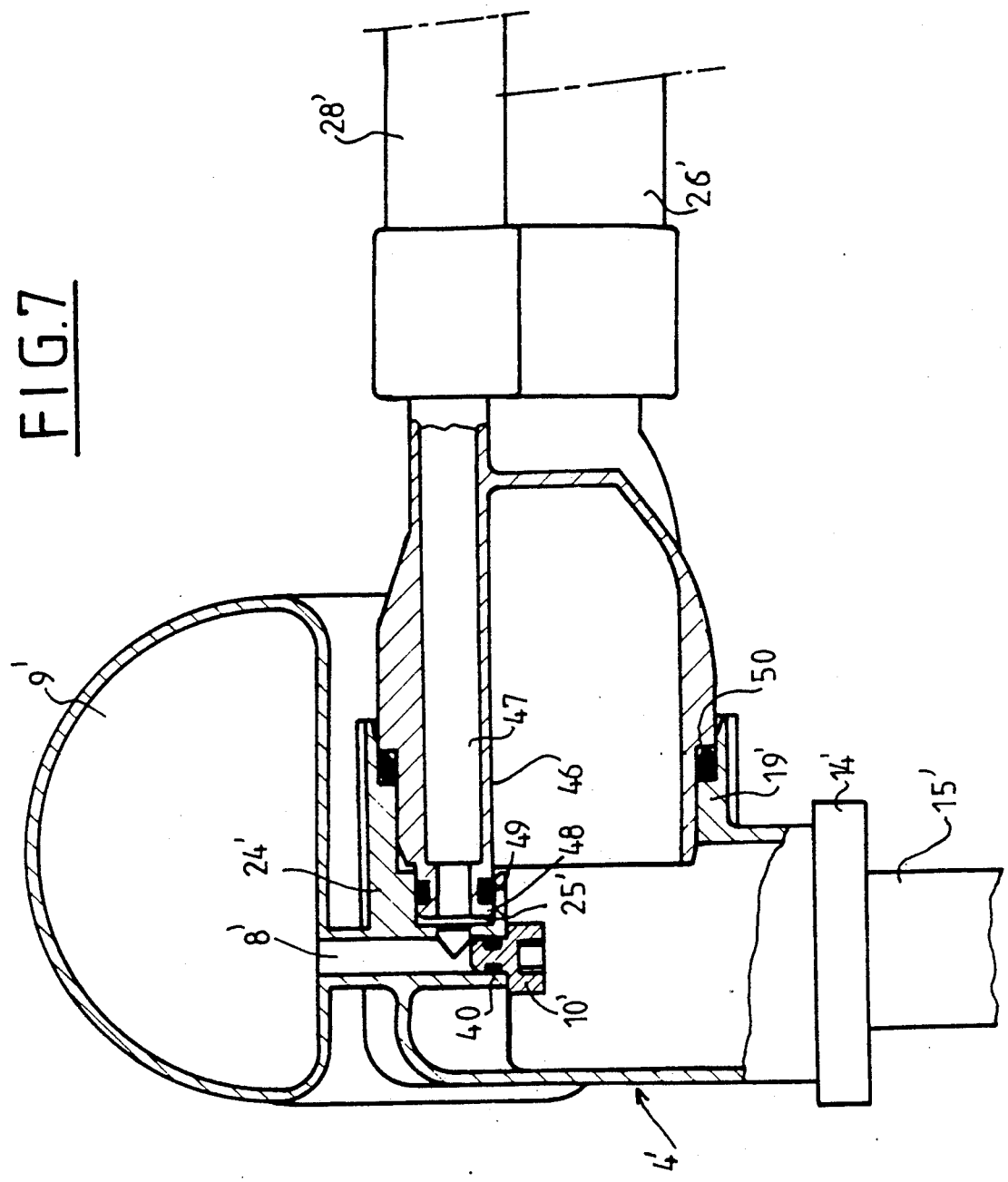
FIGS. 7 and 8 are fragmentary sectional views taken along the lines VII—VII and VIII—VIII, respectively, of FIG. 6.
Figure 8:
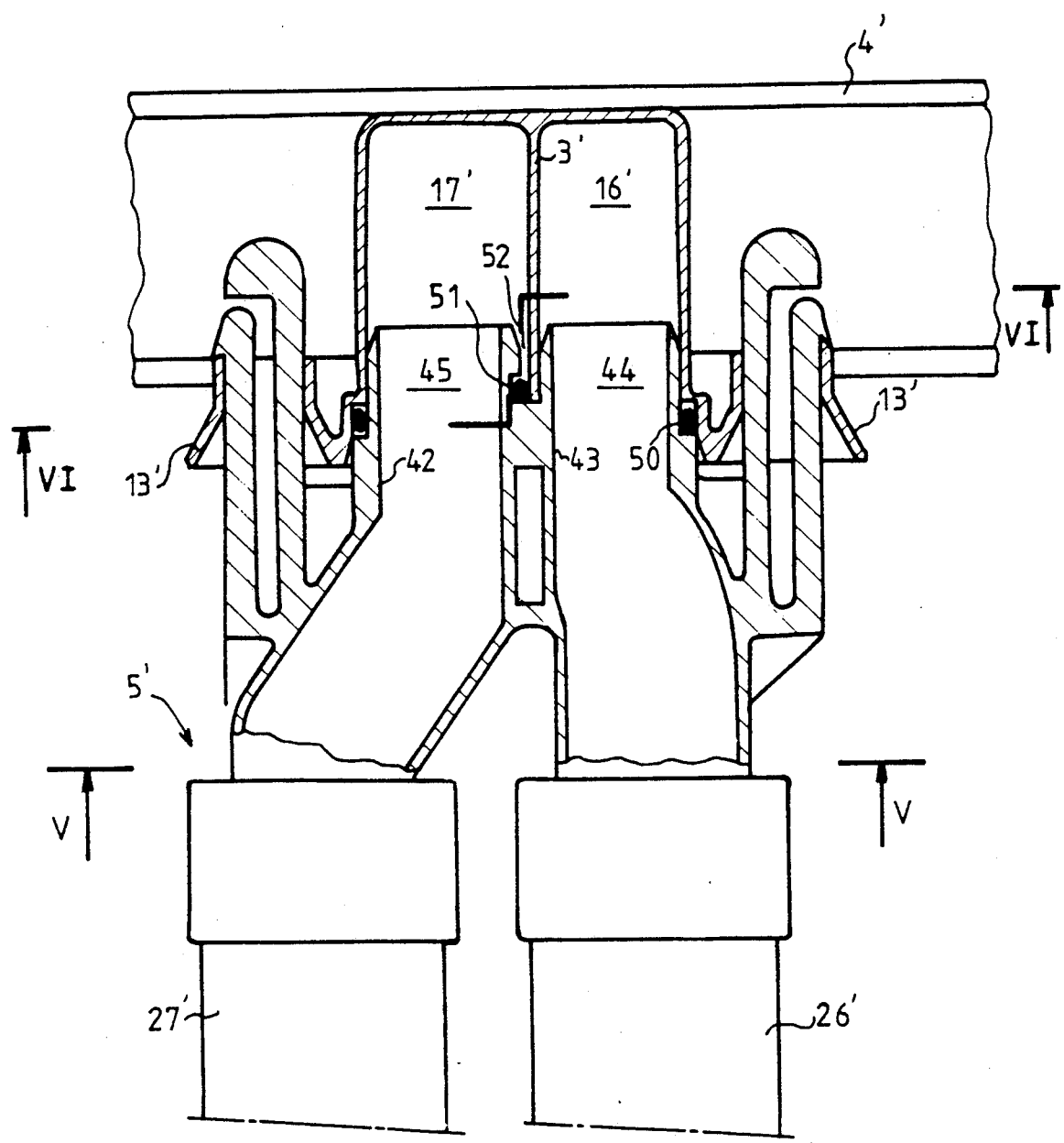
Figure 9:
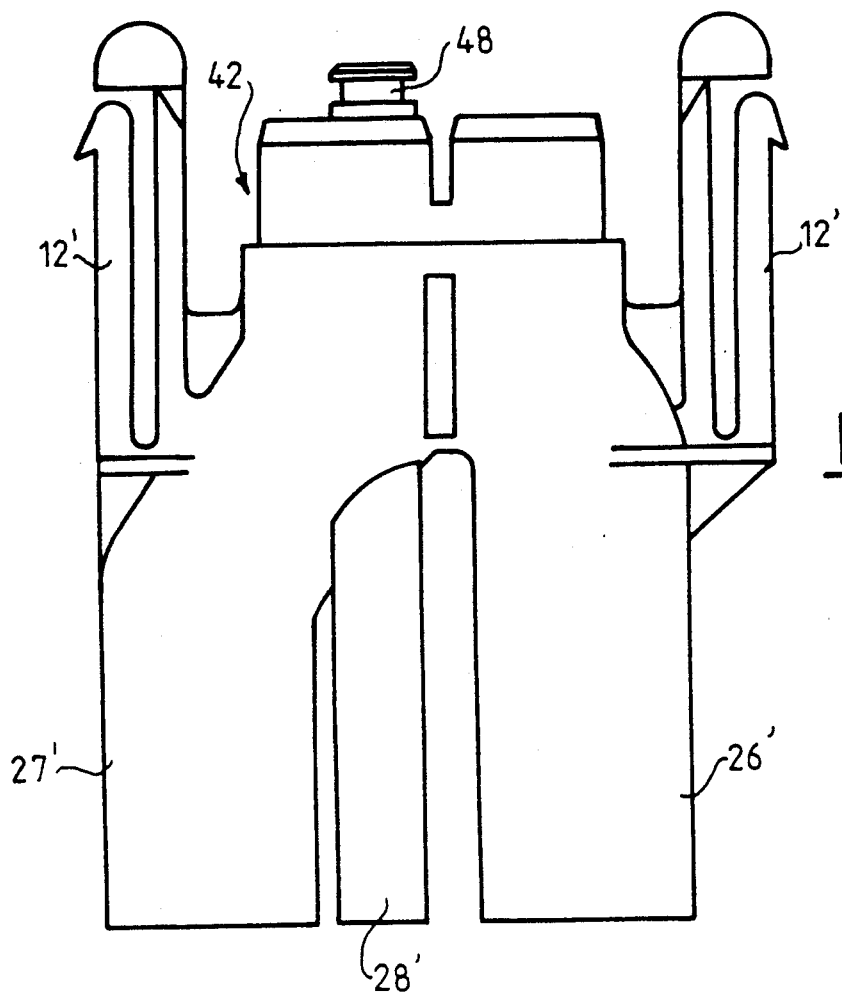
FIG. 9 is a plan view of the coupling device of the system shown in FIGS. 5-8.
Figure 10:
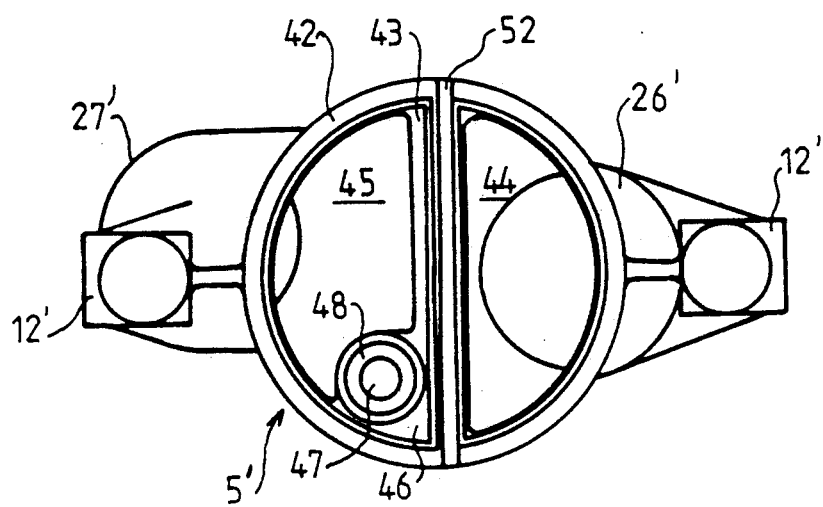
FIG. 10 is an end view of the same coupling device seen from its end turned toward the fluid tank.

In FIG. 6, it can be seen that the partition 3' is in sealed contact on its lower end with an elastomer sheet 41 that covers the collector 14' on its face turned toward the fluid tank and is penetrated in a sealed manner by the ends of the tubes 15'.

The coupling device 5' includes three pipes 26', 27' and 28', which on the side away from the fluid tank have shapes generated by revolution, are external to one another and have parallel axes, as in the case of FIG. 4. Toward the fluid tank, however, these three pipes form a single cylindrical sleeve 42 of circular cross section, axially divided by a diametrical dividing wall 43 into two passages 44 and 45, relating respectively to the pipes 26' and 27'. A boss 46 protrudes into the passage 45 from the wall of the sleeve and the dividing wall, and is provided longitudinally with a degassing passage 47 relating to the pipe 28'. This passage 47 is extended in a pipe portion 48 that with respect to the boss 46 protrudes beyond the end of the sleeve 42. The portion 48 engages the inside of the hole 25' of the fluid tank and has a toric gasket 49 cooperating with this hole.

Disposed between the sleeves 19' and 42 is a toric portion 50 of a one-piece gasket, another rectilinear portion 51 of which extends at the bottom of a diametrical slit 52 made in the thickness of the dividing wall 43 beginning at the free end of the sleeve 42. The portion 51 is connected at both ends to the portion 50 via connecting portions (not shown) extending substantially along the axis of the sleeve. The partition 3' of the fluid tank engages the inside of the slit 52 and comes into contact with the portion 51 of the gasket to provide tight sealing between the chambers 16' and 17' where they are coupled to the passages 44 and 45.

What is claimed is:

1. A heat exchanger fluid tank with a fluid inlet chamber and a fluid outlet chamber (16, 17) formed therein, and a rapid action coupling system for simultaneous coupling of the fluid inlet chamber and the fluid outlet chamber to an external circuit; a partition (3) within the fluid tank between and separating said inlet and outlet chambers, adjacent inlet and outlet openings (1, 2) in the fluid tank one in each of the two chambers respectively, said coupling system including a coupling device (5) attachable to the fluid tank and cast en bloc with at least two fluid passages (26, 27), the two fluid passages communicating respectively with the two openings in the fluid tank upon attachment of the coupling device to the fluid tank, said partition (3) of the fluid tank being substantially planar over its entire length, and the inlet and outlet openings (1, 2) being disposed one on each side of the plane of the partition (3), while being in proximity with said partition.

2. A system as defined by claim 1, including means (12, 13) for interlocking the fluid tank and the coupling device in a coupled position.

3. A system as defined in claim 2, wherein the fluid tank has an annular rim (19) protruding toward the exterior and surrounding the inlet and outlet openings for a centering of the coupling device about the inlet and outlet openings.

4. A system as defined claim 3 wherein the fluid passages of the coupling device are formed by two tubular pipes (26, 27), spaced apart from one another and having corresponding ends joined by a transverse plate (29)

cooperating at its periphery with the rim of the fluid tank.

5. A system as defined in claim 4 wherein the coupling device includes a degassing pipe (7) protruding past its plate (29) so as to pentrate the fluid tank (4).

6. A system as defined in claim 3 wherein the two fluid passages (44, 45) of the coupling device (5') are formed, in the region of communication with the openings, by a tubular sleeve (42) of substantially circular cross section, divided on the interior into semicylindrical components by a diametrical dividing wall (43), and wherein the inlet and outlet openings are substantially semicircular and are defined by the partition (3'), with the partition and the dividing wall of the sleeve being located for positioning with one in engagement with and substantially in a portion of the other.

7. A system as defined in claim 6, wherein the rim of the fluid tank forms a tubular sleeve (19') divided on the interior by the partition (3'), and the sleeve of the coupling device is engageable into the tubular sleeve of the fluid tank.

8. A system as defined in claim 7, including a one-piece gasket having a toric portion (50) disposed between the two sleeves (19', 42) and a transverse portion (51) disposed between the dividing wall (43) and the partition (3').

9. A system as defined in claim 8 including an expansion vessel (9) that is integral with the fluid tank, and means for connecting a degassing circuit to the expansion vessel.

10. A system as defined in claim 9, wherein the coupling device includes a degassing passage (47) extending through the interior of its sleeve, parallel to the axis thereof, and encroaching on at least one of the semicylindrical compartments defined by the dividing wall.

11. A system as defined by claim 10 wherein the coupling device includes a degassing pipe (48) communicating with said degassing passage and protruding past said sleeve (42) so as to penetrate the fluid tank (4').

12. A system as defined in claim 11, including a connecting conduit (8) inside the fluid tank and separate from the two chambers of the fluid tank for communicating the degassing pipe with the expansion vessel.

13. A system as defined in claim 2, wherein the two fluid passages (44, 45) of the coupling device (5') are formed, in the region of communication with the openings, by a tubular sleeve (42) of substantially circular cross section, divided on the interior by a diametrical dividing wall (43), and wherein the inlet and outlet openings are substantially semicircular and are defined by the partition (3'), with the partition and the dividing wall of the sleeve being located for positioning with one in engagement with and substantially in a portion of the other.

14. A system as defined in claim 13 wherein the rim of the fluid tank forms a tubular sleeve (19') divided on the interior by the partition (3'), and the sleeve of the coupling device is engageable into the tubular sleeve of the fluid tank.

15. A system as defined in claim 14, including a one-piece gasket having a toric portion (50) disposed between the two sleeves (19', 42) and a transverse portion (51) disposed between the dividing wall (43) and the partition (3').

16. A system as defined by claim 2 including an expansion vessel (9) that is integral with the fluid tank, and means for connecting a degassing circuit to the expansion vessel.

* * * * *